(12) United States Patent
Jackson et al.

(10) Patent No.: US 7,549,661 B2
(45) Date of Patent: Jun. 23, 2009

(54) TOWABLE COLLAPSIBLE PATIENT SUPPORTING CARRIER

(76) Inventors: Mark A. Jackson, 5188 N. Harrison Ave., Fresno, CA (US) 93711; Marc H. Segal, 222 Portland Ave., Huntington Beach, CA (US) 92648

( * ) Notice: Subject to any disclaimer, the term of this patent is extended or adjusted under 35 U.S.C. 154(b) by 189 days.

(21) Appl. No.: 11/378,848

(22) Filed: Mar. 16, 2006

(65) Prior Publication Data
US 2007/0216118 A1 Sep. 20, 2007

(51) Int. Cl.
*B60D 1/155* (2006.01)
*B60D 1/36* (2006.01)
*B62B 7/00* (2006.01)

(52) U.S. Cl. .................. 280/204; 280/656; 280/657; 280/658; 280/476.1; 280/477; 280/482; 280/491.1; 280/493.3

(58) Field of Classification Search ............... 280/204, 280/656, 657, 658, 476.1, 477, 482, 491.1, 280/493.3
See application file for complete search history.

(56) References Cited

U.S. PATENT DOCUMENTS

| | | | | |
|---|---|---|---|---|
| 559,761 | A * | 5/1896 | Trancle-Armand | .......... 280/204 |
| 2,254,797 | A * | 9/1941 | Dubay | .......... 280/204 |
| 2,394,277 | A * | 2/1946 | Viner | .......... 280/204 |
| 3,567,249 | A * | 3/1971 | Robinson | .......... 280/204 |
| 4,216,556 | A | 8/1980 | Haeussinger | |
| 4,670,921 | A | 6/1987 | Avni et al. | |
| 4,786,073 | A * | 11/1988 | Harper | .......... 280/656 |
| 5,414,883 | A | 5/1995 | Fangrow, Jr. | |
| D413,553 | S | 9/1999 | Ferko, III | |
| 6,055,988 | A | 5/2000 | Perisho | |
| 6,357,063 | B1 | 3/2002 | Selby | |
| 6,443,157 | B1 | 9/2002 | Sargent | |
| 6,834,882 | B1 * | 12/2004 | Boyd | .......... 280/656 |
| 6,842,923 | B1 | 1/2005 | Castellani et al. | |
| 6,845,533 | B1 | 1/2005 | Tulette | |
| 6,954,952 | B1 | 10/2005 | Kroupa | |
| 7,017,940 | B2 * | 3/2006 | Hatfull | .......... 280/652 |
| 7,073,816 | B1 * | 7/2006 | Larson et al. | .......... 280/656 |
| 2005/0173887 | A1 * | 8/2005 | Chen | .......... 280/204 |
| 2005/0184485 | A1 * | 8/2005 | Timmermans | .......... 280/656 |
| 2006/0091646 | A1 * | 5/2006 | Steins | .......... 280/656 |
| 2006/0279071 | A1 * | 12/2006 | Spainhower | .......... 280/656 |

\* cited by examiner

*Primary Examiner*—Christopher P Ellis
*Assistant Examiner*—John R Olszewaki
(74) *Attorney, Agent, or Firm*—Mark Jackson; Marc Segal (57) ABSTRACT

A collapsible patient supporting carrier configured as either a backboard or a stretcher for being pulled or towed behind a person, animal or vehicle, such as a bicycle, motorcycle, snow mobile or jet ski. The carrier comprises a plurality of support sections interconnected by connecting mechanisms that are configured to selectively place the carrier in a collapsed condition having a support surface for carrying medical supplies or an extended condition for transporting an injured person. Each support section is made up of a frame and one or more support members, such as a rigid plate or a somewhat flexible material, attached to the frame. The forward end of the carrier has a tow connector member to connect to a tow member for towing. Transport members, such as wheels, skis or a floatation member, are operatively connected near the second end of the carrier to facilitate movement over a surface.

24 Claims, 6 Drawing Sheets

TOWABLE COLLAPSIBLE PATIENT SUPPORTING CARRIER

BACKGROUND OF THE INVENTION

A. Field of the Invention

The field of the present invention relates generally to apparatuses utilized to support and transport injured or incapacitated patients for emergency medical treatment. More specifically, this invention relates to stretchers and backboards that are configured to be collapsible so as to be easily transported to locations that are generally inaccessible to ambulances and other large vehicles. Even more specifically, this invention relates to such stretchers and backboards that are configured to be towed by a bicycle, motorcycle, snow mobile, personal watercraft, person, dog, horse or other towing systems.

B. Background

Many people enjoy participating in outdoor activities such as running, hiking, mountain climbing and the like, many of which occur in somewhat or very remote locations, including mountains, beaches and woods. Unfortunately, one of the drawbacks of many of these activities for the outdoor enthusiast is the danger of serious injury or illness in an area that is difficult for emergency personnel to reach, particularly with the emergency equipment needed to stabilize, treat and transport the injured person. As is well known, when an injury or serious illness does occur in a remote or hard to reach location, it can then be very difficult to safely transport the injured or incapacitated person from the remote location to a medical facility for treatment. This problem is particularly an issue in areas where roads are either non-existent, too narrow or otherwise unsuitable for a typical full-sized vehicle, such as an ambulance or fire truck, to traverse. In such situations, it is necessary to use either a helicopter to reach the injured or incapacitated person or for a team of emergency medical service personnel, such as paramedics or other rescue personnel, to hike through difficult and often dangerous terrain to reach the injured or ill person (hereinafter "patient"). In the helicopter rescue scenario, the helicopter lowers emergency rescue personnel and a stretcher, backboard or other lifting device to the patient, who is then loaded onto the lifting device and raised up into the helicopter for transport to a hospital. In the hike-in scenario, once the patient is reached the rescue team must physically lift and carry the patient on a stretcher or backboard as they hike back to safety, which can be dangerous and time consuming for the rescue team and patient.

In any medical emergency situation it is usually desirable to immobilize the patient as much as possible to avoid further injury during movement of the patient from the injury site to a location for further treatment or to an ambulance or other vehicle for transport to a hospital. For many years, the apparatus of choice to move a patient to a place of further treatment or a vehicle was a stretcher, which in its basic form comprises a pair of elongated rail-like support members with a fabric or other generally flexible material stretched between the two support members. Typically, the ends of the stretcher have handles which the rescue personnel utilize to carry the patient on the stretcher. To some extent, stretchers of this type have fallen out of favor because of the inability to immobilize the patient, due generally to the flexibility of the material, while transporting the patient. A more modern approach is to utilize a generally flat, stiff backboard instead of the stretcher due to its ability to better immobilize the patient. The typical backboard, as exemplified by U.S. Pat. No. 6,055,988 to Perisho, U.S. Pat. No. 5,414,883 to Fangrow, Jr., U.S. Pat. No. 4,473, 912 to Scheidel, et al. and Des. 413,553 to Ferko, III, comprises a rigid elongated board member having hand holds and one or more strap cavities for receiving straps to secure the patient to the board member. Generally, the patient is placed on the backboard with the straps used to tightly secure the patient to the backboard so as to prevent movement of at least the injured area of the patient's body.

One of the difficulties with using a stretcher or backboard to move an injured person from the place of injury to a place where he or she can be better treated or be transported to a hospital is quickly getting the stretcher or backboard, as well as other medical supplies, to the injured person's location. In cases where there is significant trauma, as is often the case where emergency personnel are needed, speed and a streamlined manner of working can be a matter of life and death, making it imperative to reach the patient for transport to a medical facility as quickly as possible. Waiting for the arrival of medical supplies and equipment can be very detrimental to the patient. To speed the delivery of medical treatment to injured persons, many cities, counties or other municipalities have initiated the use of deploying emergency medical personnel on small vehicles (including bicycles, motorcycles, snow mobiles and personal watercraft, such as jet skis and the like), on foot or on horseback in areas where and at times when emergency medical services are likely to be needed. For instance, during a marathon or other running race emergency medical technicians or EMTs may be deployed on a bicycle in the area of the race. EMTs may also be deployed on bicycles during bicycle races, mountain biking competitions and like events. In addition, bicycle deployed EMTs are also assigned to patrol beaches, mountains, parks and other areas where people are known to gather for recreational activities that may result in the need for emergency medical treatment. EMTs have also been deployed on motorcycles, personal watercraft and snow mobiles, as appropriate for the terrain and conditions as a routine safety precaution.

One of the major benefits of deploying EMTs on a small vehicle, on foot or on horseback is that they can be somewhat more readily available when someone gets injured or becomes seriously ill. By already being deployed, as opposed to being at a station or the like and then deploying when called, the time between the injury occurring and an EMT arriving at the location of injury can be significantly reduced. In addition, the deployment of EMTs on foot, horseback or small vehicles is substantially less intrusive on the outdoor activities, particularly competitions or other events where there may be large crowds of people, than the deployment of ambulances or other full sized vehicles. Another important advantage of such deployment is that the EMT on foot, horseback or small vehicle is much more likely to be able to reach an area where a person has become injured, particularly areas that are remote or that require the traversing of rough terrain, than the full sized vehicle. As set forth above, very often injuries occur in areas that do not have roads or are otherwise inaccessible to full sized vehicles. In such situations, the EMT will travel on foot, horseback or on the small vehicle, such as a bicycle, to the location of the injured person in order to initiate medical treatment and/or to provide for the evacuation of the patient.

One of the major limitations with the deployment of EMTs or other medical personnel on foot, horseback or small vehicle is the need to carry sufficient medical supplies in order to be of beneficial assistance to an injured person. Naturally, the EMT is limited to the medical supplies and equipment that he or she can carry on their person or what can be attached to or towed by the horse or small vehicle. For instance, most foot and some bicycle deployed EMTs have a backpack that they wear which carries a supply, somewhat limited, of medical materials. Some bicycle bound EMTs utilize a small tow-behind trailer that attaches to the bicycle to carry medical supplies. Motorcycle and snow mobile deployed EMTs have also been known to utilize small trailers to carry medical supplies and equipment. While many of the medical supplies that may be useful to an EMT or other medical personnel can be carried in a backpack or on a small trailer, a stretcher or backboard cannot be as easily carried. Even if a stretcher or backboard can be carried by a foot bound EMT or towed behind a horse or small vehicle, the use thereof presents a practical problem, namely what does the EMT do with the patient once he or she is placed on and/or secured to the stretcher or backboard. Because a single EMT cannot safely carry or otherwise move an injured person on a stretcher or backboard, the EMT must have other people, preferably trained personnel, assist him or her with the movement of the patient. The safe and effective utilization of a stretcher or backboard requires the use of at least two people, but preferably four people with one positioned at each corner, to carry a patient on the stretcher or backboard. Unfortunately, the need to have this assistance can significantly delay the amount of time required to get the patient to the hospital, typically via a waiting ambulance or other emergency vehicle, which can have adverse consequences for the patient.

Issues with regard to needing multiple persons to transport an injured person on a stretcher or backboard is not limited to situations of injuries that occur during outdoor activities. For instance, during military or major police operations people are likely to get injured. The evacuation of the injured person from the area, such as a battlefield, will require the assistance of multiple persons to move the patient to an area out of harms way. During military operations this can be a significant issue for the deployment of troops sufficient to carry out their mission. As well understood in the military, injuries on a battlefield present a particular problem for maintaining battlefield operations due to the fact that a single injured person can tie up or otherwise substantially remove four or more other soldiers from the action while they assist with the evacuation of the injured person on a stretcher or backboard. Naturally, this is likely to reduce the effectiveness of and create more danger for the remaining soldiers. As a result, it is desirable to provide a device that also reduces the need for assistance to remove an injured soldier or other person from a battlefield.

A number of prior patents have attempted to address the issue of improved patient transport on a stretcher or backboard. For instance, U.S. Pat. No. 6,845,533 to Tulette discloses a patient transport device having a flat rigid board with a pair of foldable runners attached to the sides thereof for moving a patient up or down a flight of stairs or other such surface. In one embodiment, an axle and wheel assembly is attached to one end of the board for easier patient maneuverability, via a dolly like operation, through tight areas like narrow hallways or corridors. U.S. Pat. No. 6,357,063 to Selby discloses a patient carrier device dolly assembly that has a box frame with wheels mounted thereto and in which is received one end of a patient carrier device, such as a backboard, to allow the user to move a patient on the carrier device by tilting it like a standard dolly. Other prior art patents are directed to stretchers which are configured to be collapsible or disassemblable. For instance, U.S. Pat. No. 4,670,921 to Avni, et al. discloses a portable collapsible stretcher that has a pair of elongated frame poles having multiple joints for folding the poles lengthwise and one or more collapsible spreader bars for folding the frame widthwise. A flexible support sheet is suspended from the frame poles to provide the weight-bearing platform for carrying the patient. U.S. Pat. No. 6,842,923 to Castellani et al. discloses a lightweight decontaminable composite stretcher having a molded frame assembly comprising a pair of frame poles interconnected by a collapsible spreader bar to maintain the poles in a laterally spaced arrangement and a bed member for supporting and carrying the patient. The frame poles have multiple hinges to facilitate folding the stretcher for storage and transport. U.S. Pat. No. 4,216,556 to Haeussinger discloses an extrication splint for accident victims that is assembled beneath an injured person at the accident site to move the person to a gurney or like device. The splint comprises a plurality of cross-bars which are slid beneath the victim and parallel side-rails, having jointed segments to accommodate the natural bends of the human body, assembled to the crossbars to form a rigid structure to remove the patient from accident site, such as the interior of a vehicle. While the foregoing disclose mobile stretcher or backboard mechanisms and stretchers that are collapsible or disassemblable, none of these devices are particularly useful for the foot, horseback or small vehicle bound EMT or other medical personnel to easily and readily have a stretcher or backboard with them and then be able to transfer a patient away from the injury site on the stretcher or backboard without assistance from one or more other persons. In fact, a major shortcoming of most of the prior art patient carrier devices is that more than one person is needed to lift and move the device once the patient is secured to its surface. In times where manpower is limited, this can render the device all but useless. Devices that are configured to more easily move a patient do so in a dolly-like manner and do not provide for easy movement of the device to the injured person, particularly in a remote or hard to reach area.

What is needed, therefore, is a patient transport device that can be configured as a stretcher or backboard which is sturdy, lightweight and collapsible so that it may be easily transported to an accident site and then reassembled for removing an injured or incapacitated person from the site for further treatment and/or transport to a hospital. In its collapsed condition, the preferred patient transport device should provide a surface upon which medical supplies and/or equipment can be secured and carried, thereby enabling the rescue or medical personnel to easily transport the medical supplies and/or equipment to the injured person. The preferred patient transport device should also be configured to be easily pulled or towed behind an EMT or other person who is on foot, horseback or small vehicle for transport of the stretcher or backboard to where the injured person is located and then transport of the patient on the stretcher or backboard away from the injury location without the assistance of other persons in order to allow an EMT or other rescue personnel to more quickly respond to and transport accident victims. The preferred patient transport device should be adaptable to be towed behind a person on foot, a horse or other animal, or a small vehicle, such as a bicycle, motorcycle, snow mobile or personal watercraft in a variety of different terrains. The preferred patient transport device should also be configured for easily, quickly and securely going from its collapsed condition to its extended condition for use as a stretcher or backboard.

SUMMARY OF THE INVENTION

The towable collapsible patient supporting carrier of the present invention provides the benefits and solves the problems and/or overcomes the limitations of the prior art set forth above. That is to say, the present invention discloses a patient supporting carrier which is substantially foldable or collapsible for easy transport to the location of an injured person and then easily unfolded or otherwise reassembled to provide a stretcher or backboard that is suitable for safely removing the injured person from the injury site. The patient supporting carrier of the present invention is adaptable for being easily pulled or towed behind a person, horse or other animal, or a small vehicle, such as a bicycle, motorcycle, snow mobile, personal watercraft and the like. The patient supporting carrier of the present invention can be rapidly transported to an injury site, including those which are remote or across rough terrain, and then assembled into a stretcher or backboard to allow a single EMT or other rescue person to transport the patient to a location for further treatment and/or transport to a hospital. As such, the present invention speeds medical care to a person injured in a remote or hard to reach area and reduces or eliminates the need for multiple persons to carry a stretcher or backboard away from the injury site.

In one general aspect of the present invention, the patient supporting carrier has a plurality of individual support sections that, collectively, define an elongated platform which is suitable for transporting an injured person to a location for further treatment or for transport to a hospital or other medical facility. Each of the support sections has a frame and one or more support members that are attached to the frame. The support members can be rigid plates, made out of a stiff material such as aluminum, plastic, fiberglass or the like to configure the carrier as a backboard, or they can be flexible material, such as cloth, mesh, canvas or the like to configure the carrier as a stretcher. To be collapsible, there are at least two support sections that are joined by a connecting mechanism configured to selectively place the carrier in a collapsed condition or an extended condition. In the collapsed condition, at least one of the support members defines a support surface for transporting medical supplies and equipment to where an injured person is or may be located. In a preferred embodiment, the platform is made up of three separate support sections with a first connecting mechanism interconnecting the first and second support sections and a second connecting mechanism interconnecting the second and third support sections. The second connecting mechanism is configured to pivot the second support section onto the third support section and the first connecting mechanism is configured to pivot the first support section onto the second support section so as to place the carrier in its collapsed condition. At least one transport member, which can be a pair of wheels or skis or a floatation member, as examples, is connected to the frame at or near the second end of the platform to facilitate movement of the carrier over a surface, such as the ground, snow or water. A tow connector is located at or near the first end of the platform to connect the carrier with one or more tow members for towing the patient supporting carrier behind a towing element, which can be a person, animal or vehicle, such as a bicycle, motorcycle, snow mobile or jet ski. Preferably, the frame for each of the support sections is made from lightweight, strong and substantially corrosion resistant materials, including aluminum, polycarbonate or other composite compositions and fiberglass. The platform can include a shield device to shield the patient from wind, sun, rain or other elements, a support rod for supporting the platform in a substantially horizontal position when it is detached from the towing element and/or handles at the ends for transporting the carrier by hand using two or more persons to support the carrier and the patient thereon. Use of the carrier of the present invention will make it easier and faster for a single rescuer to deliver a backboard or stretcher to an injured person in a remote or inaccessible area and to transport the patient away from the accident site to a location for further treatment or transport to a hospital without the need for more people to help carry the backboard or stretcher.

Accordingly, the primary objective of the present invention is to provide a towable collapsible patient supporting carrier, configured as a stretcher or backboard, that provides the advantages discussed above and overcomes the disadvantages and limitations associated with presently available patient supporting carriers.

It is also an important objective of the present invention to provide a patient supporting carrier that is collapsible for ease of transport and easily reassembled into a stretcher or backboard for transport of a patient away from an injury site.

It is also an important objective of the present invention to provide a patient supporting carrier that is configured for being easily pulled or towed behind a person, horse or other animal, or a small vehicle, such as a bicycle, motorcycle, snow mobile, personal watercraft and the like in a collapsed condition for transport of the device to an injury site and in an extended condition for transport of a patient to a place for further treatment or transport to a hospital.

It is also an important objective of the present invention to provide a patient supporting carrier that is configured to allow a single EMT or other person to easily and quickly transport a stretcher or backboard to the location of an injured person and then transport the injured person away from the injury site without the need for others to assist in carrying the stretcher or backboard.

It is yet another objective of the present invention to provide a portable patient supporting carrier that is lightweight and collapsible with at least one surface on which medical equipment and/or supplies can be secured to efficiently and quickly transport these materials to an injured person.

It is also an objective of the present invention is to provide a towable, collapsible patient supporting carrier that can be utilized in a wide variety of injury settings which are generally inaccessible for traditional forms of patient transport.

It is also an objective of the present invention is to provide a towable collapsible patient supporting carrier that can be carried in a backpack or other small carrier for delivery to an accident site.

The above and other objectives of the present invention will become readily apparent and are explained in greater detail by reference to the attached figures and the description of the preferred embodiment which follows. As set forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represent one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For purposes of simplifying the present disclosure, reference herein is generally to a the configuration of the towable collapsible patient supporting carrier as a backboard that is used to transport injured or incapacitated individuals by an EMT or other emergency personnel. However, as will be readily understood by those skilled in the art, the disclosure is not so limited as it is adaptable to stretchers and other types of patient supporting carriers that can be pulled or towed behind a variety of different vehicles and utilized under an array of different transport circumstances.

A towable collapsible patient supporting carrier that is manufactured out of the components and configured pursuant to a preferred embodiment of the present invention is shown generally as 10 in the figures. Patient supporting carrier 10 is configured to be towed by a towing element 12, such as the bicycle shown in FIGS. 1 and 2, that attaches to patient supporting carrier 10 with one or more tow members 14. In the preferred embodiment, shown in FIGS. 1 through 5, patient supporting carrier 10 is configured as a stiff backboard for use to transport an injured person from where they were injured or are located to a place where they can either receive more thorough medical treatment or be transported to a hospital or other facility for further care. The patient supporting carrier 10 is configured to be stored and transported to the injury site in its collapsed condition, shown as 16 in FIGS. 1 and 3, and then unfolded, assembled or otherwise configured in its extended condition, shown as 18 in FIGS. 2 and 4. In the collapsed condition 16, patient supporting carrier 10 provides a support surface 20 for securing and transporting medical supplies, equipment or other materials for use in treating or otherwise assisting an injured person at the site of his or her injury. In the extended condition 18, patient supporting carrier 10 provides a platform 22 for placing the patient thereon for transport of the patient away from the injury site. As will be explained in more detail below, in the preferred embodiment of the present invention, tow members 14 connect at or near the first or forward end 24 of platform 22. Located at or near the second or rearward end 26 of platform 22 are two transport members 28, such as the wheels shown in FIGS. 1 through 3 and 5 through 7, that operatively connect to the first side 30 and second side 32 of platform 22 in a manner that facilitates movement of patient supporting carrier 10 over the ground or other surface.

Figure 1:
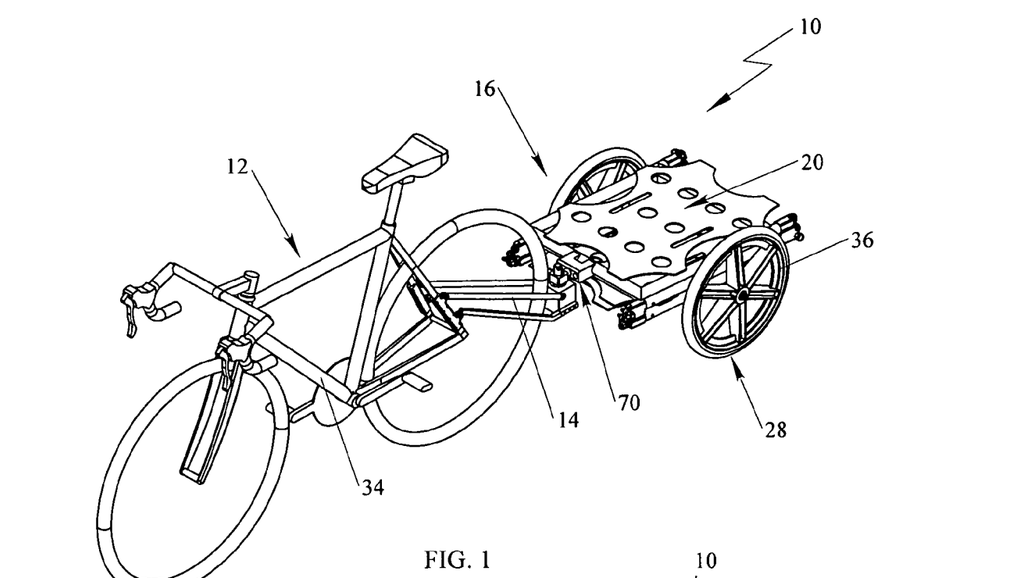
FIG. 1 is a perspective top view of a towable collapsible patient supporting carrier configured according to a preferred embodiment of the present invention shown in its collapsed condition attached to a bicycle.
Figure 2:
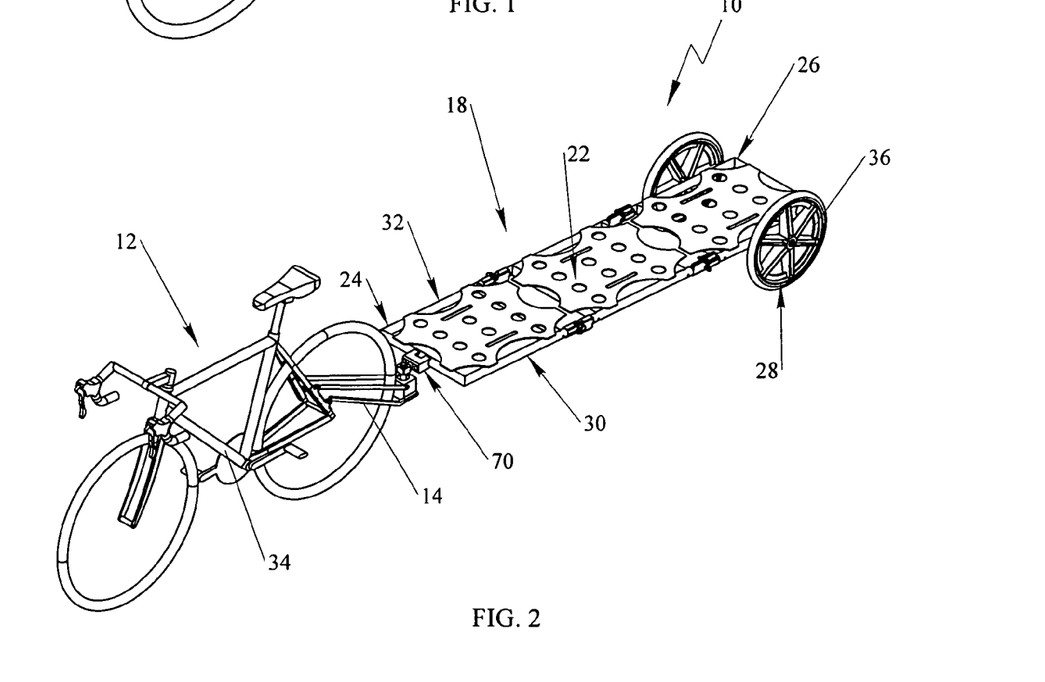
FIG. 2 is a perspective top view of the patient supporting carrier of FIG. 1 shown in its extended condition and configured as a backboard.

As shown in the figures and set forth in more detail below, the patient supporting carrier 10 of the present invention is adaptable to a number of different variations with regard to components and use. For instance, although not shown in the figures, towing element 12 can be a variety of different types of vehicles, preferably small vehicles such as motorcycles, snow mobiles and jet skis (and other personal watercraft), or it can be a person or an animal, such as a horse or dog, instead of the bicycle shown in FIGS. 1 and 2. Depending on the towing element 12 utilized, tow member 14 and/or the transport members 28 will be changed to correspond to the usage of patient supporting carrier 10. For example, in one of the preferred embodiments, shown in FIGS. 1 and 2, patient supporting carrier 10 attaches to bicycle 34 and transport member 28 is a pair of wheels 36 that are rotatably attached on each of the first 30 and second 32 sides of platform 22 such that patient supporting carrier 10 will roll with the movement of bicycle 34. In FIGS. 1 and 2, tow member 14 is sized and configured to attach to the rear portion of the frame of bicycle 34. As known to those skilled in the art, however, tow member 14 can alternatively be configured to attach to the rear axle or underneath the seat of bicycle 34. In any such configuration, it is preferred that tow member 14 be sized and configured to dispose platform 22 in a substantially or nearly horizontal position for the comfort of an injured patient who will be transported on platform 22.

Figure 4:
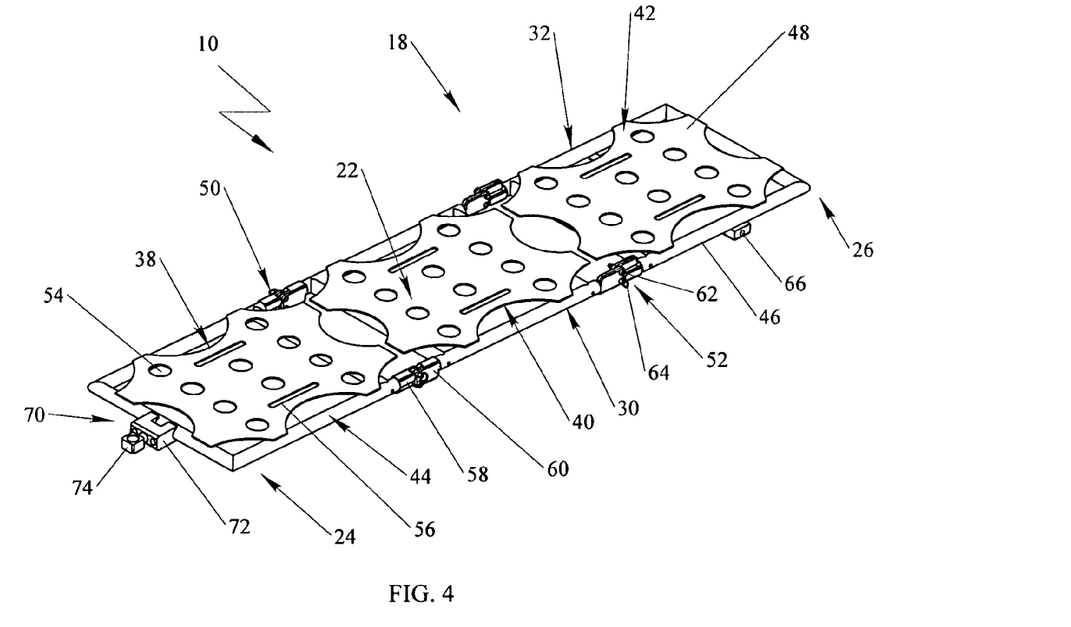
FIG. 4 is a perspective top view of the patient supporting carrier of FIG. 2 shown without the bicycle and with its wheels removed.

As stated above, patient supporting carrier 10 is configured to allow the user to selectively move between the collapsed condition 16 for storage or while towing to an accident site and the extended condition 18 for use to carry an injured person on platform 22. To facilitate this operation, the preferred embodiment of patient supporting carrier 10 has a plurality of support sections, such as first support section 38, second support section 40 and third support section 42, as best shown in FIG. 4, that collectively define platform 22. In the embodiment shown in the figures, first 38, second 40 and third 42 support sections are substantially the same, each having a frame 44 made up of a plurality of frame members, shown as 46, and at least one support member 48 that is attached to frame 44. A connecting mechanism, such as first connecting mechanism 50 and second connecting mechanism 52 connects two adjacent support sections together, such as first support mechanism 50 connects first support section 38 and second support section 40 and second support mechanism 52 connects second support section 40 and third support section 42, as best shown in FIG. 4. In the preferred embodiment, support members 48, frame 44 and connecting mechanisms 50 and 52 are all cooperatively configured such that the combination results in a substantially planar platform 22 for the comfort and safety of an injured person being transported thereon. Although the embodiments shown in the figures have three support sections, those skilled in the art will readily understand that the invention is not so limited, as patient supporting carrier 10 can have only two support sections or more than three, with an appropriate number of connecting mechanisms to interconnect adjacent support sections, and still provide the benefits of the present invention. Likewise, although support sections 38, 40 and 42 are shown and described herein as being substantially the same, those skilled in the art will also know that they may be configured differently from each other and still obtain the benefits of the present invention.

In a preferred embodiment of the present invention, frame 44 is made up of tubular aluminum frame members 46 and the support member 48 comprises an aluminum plate, for each of first 38, second 40 and third 42 support sections, to provide a lightweight platform 22 that is substantially rigid and strong. Various other materials are also suitable for use for frames 44 and support members 48. For instance, frames 44 and/or support members 48 can be made of plastics, fiberglass, composites, stainless steel and various other metals and non-metal materials. Preferably, the materials for frames 44 and support members 48, as well as the other components of patient supporting carrier 10, are selected to be lightweight, strong, durable and substantially corrosion and impact resistant. The embodiment of FIGS. 1 through 5 utilize support members 48 that are substantially rigid to provide platform 22 as a backboard useful for immobilizing the patient thereon. The embodiment of FIG. 6 utilizes support members 48 that are somewhat flexible, such as cloth, mesh, leather and canvas, or a variety of other types of materials that are commonly utilized for stretchers. In the stretcher-type embodiment of FIG. 6, the frames 44 are still preferably made out of rigid materials to safely support the patient on platform 22 during transport. In any of these embodiments, the support members 48 are attached to the frame members 46 utilizing any number of mechanisms, such as screws and bolts, and other devices, including welding and adhesives, appropriate for the materials being utilized by these components.

In the preferred embodiment, patient supporting carrier 10 is configured to securely attach a patient thereto in a manner that substantially immobilizes the patient thereon. In the embodiment shown, support members 48 comprise a plurality of openings, such as holes 54 and slots 56, that cooperate with one or more strap members, not shown, to strap a patient to platform 22 during the movement of the patient on patient supporting carrier 10. As shown, holes 54 and slots 56 are preferably provided along the length of platform 22 so the EMT or other user may strap down the head, torso and legs of the patient. If desired, the straps may also or alternatively be configured to cooperatively engage frame 44.

Figure 3:
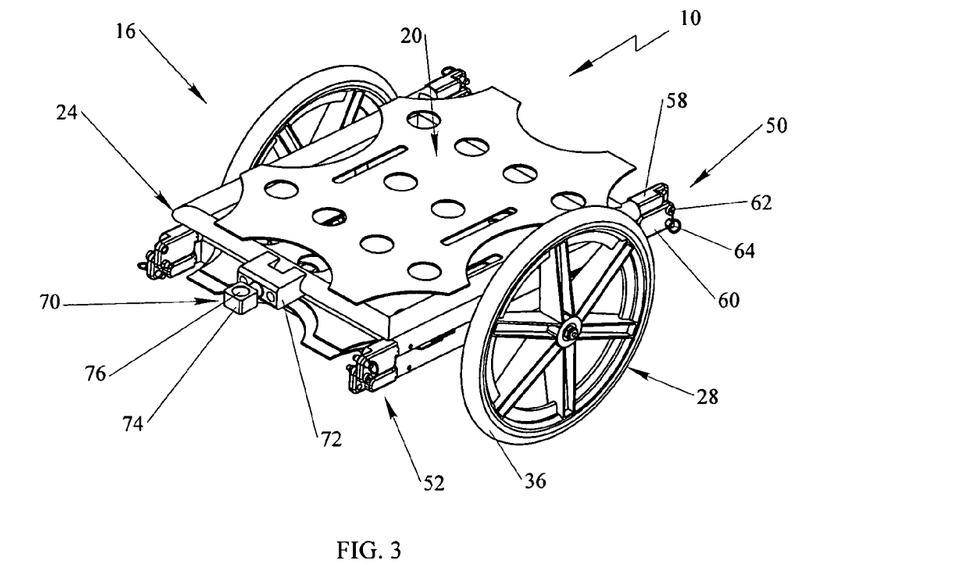
FIG. 3 is a perspective top view of the patient supporting carrier of FIG. 1 shown without the bicycle.

As stated above, the separate support sections are connected by a connecting mechanism, such as first connecting mechanism 50 and second connecting mechanism 52. In the preferred embodiment, connecting mechanisms 50 and 52 are both configured to pivot one support section on top of the adjacent support section. For instance, as best shown in FIG. 3, second connecting mechanism 52 is configured to pivot second support section 40 on top of third support section 42 and first connecting mechanism 50 is configured to pivot first support section 38 on top of second support section 40, thereby effectively "sandwiching" second support section 40 between the first 38 and third 42 support sections. This configuration results in the support member 48 of first support section 38 defining the support surface 20 that is useful for carrying medical supplies and equipment to the location of an injured person. In addition to pivoting the respective support sections, in the preferred embodiment first 50 and second 52 connecting mechanisms are also configured to selectively lock patient supporting carrier 10 in either its collapsed condition 16 or its extended condition 18, as best shown in FIGS. 1 through 4. In a preferred embodiment, best shown in FIGS. 3 through 5, connecting mechanisms 50 and 52 comprise a first connecting member 58 and a second connecting member 60 that are configured to receive pivot pin 62 and removable locking pin 64. With regard to first connecting mechanism 50, first 58 and second 60 connecting members are cooperatively configured to allow first support section to pivot with respect to second support section 40 and then fold over on top of second support section 40, as best shown in FIG. 3. Second connecting mechanism 52 is likewise configured with regard to second 40 and third 42 connecting mechanisms. Pivot pin 62 is configured to allow first connecting member 58 to pivot relative to second connecting member 60 for each of connecting mechanisms 50 and 52. Locking pin 64 is configured to be received in first 58 and second 60 connecting members so as to lock the respective support sections, such as first 38 and second 40 support sections and second 40 and third 42 support sections in the desired collapsed 16 or extended 18 conditions. In a preferred embodiment, locking pin 64 is of the ring pull type, such as a double acting stainless steel quick release pin, that allows the user to pull on the ring to remove locking pin 64 from first 58 and second 60 connecting members to move between the collapsed 16 and extended 18 conditions. Other types of locking pins than that described will also be useable for locking pin 64. Likewise, first 50 and second 52 connecting mechanisms can be configured differently than shown and described and still provide the benefits set forth herein. For instance, first 50 and second 52 connecting members can comprise one or more hinges instead of the connecting member 58 or 60 and pivot pin 62 combination and a locking mechanism, such as a sliding tube member or a variety of other devices, can be utilized instead of locking pin 64. In addition, support sections 38, 40 and 42 can be configured to pivot and fold differently than that described above and shown in the figures.

Figure 5:
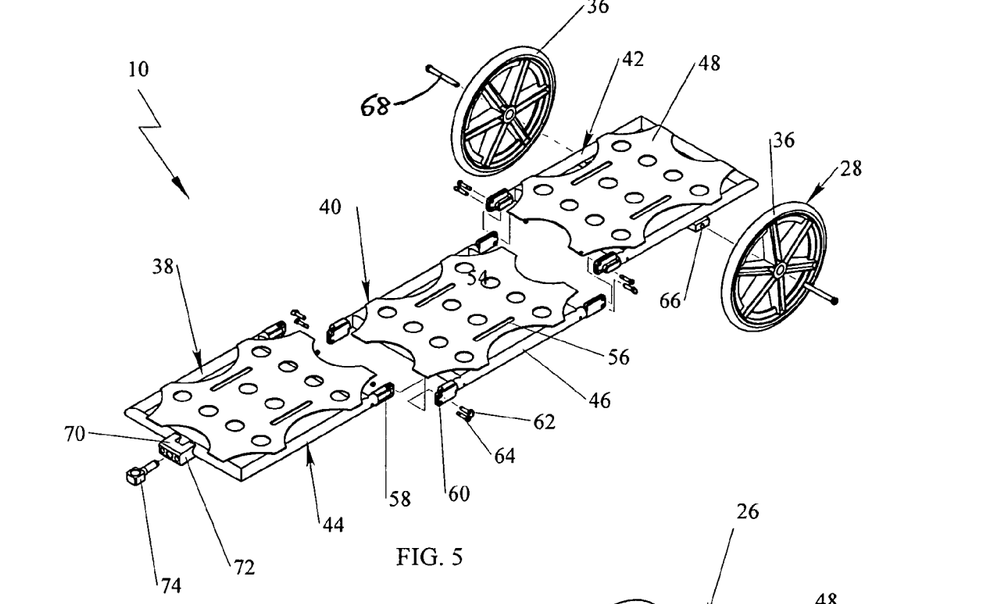
FIG. 5 is an exploded top perspective view of the patient supporting carrier of FIG. 2 shown without the bicycle.
Figure 6:
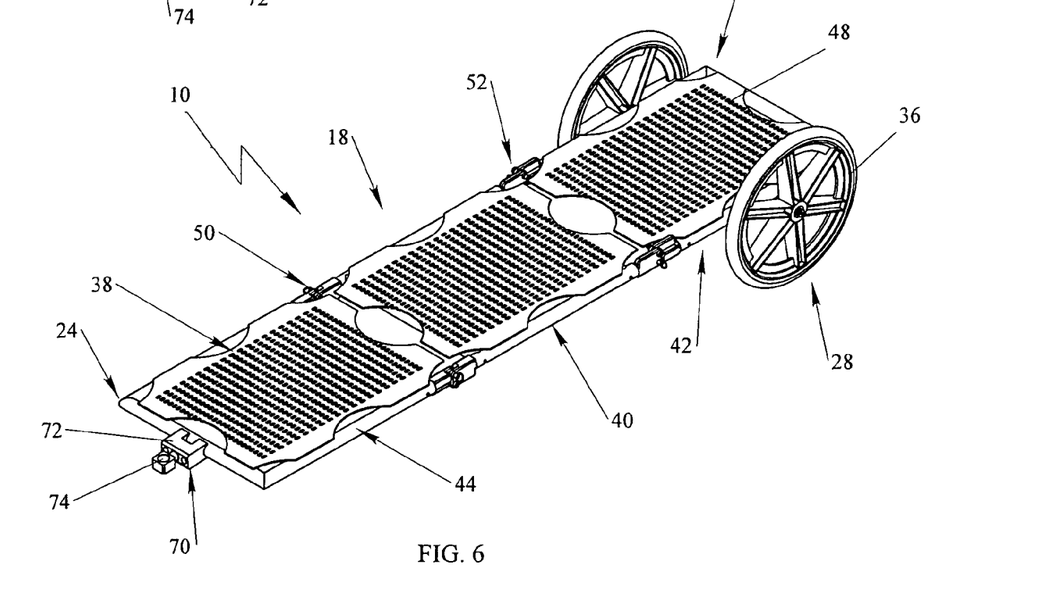
FIG. 6 is a top perspective view of the patient supporting carrier of the present invention showing the carrier configured as a stretcher with panels made out of a flexible material.

In the preferred embodiment, as shown in FIGS. 1 through 7, patient supporting carrier 10 is configured with a pair of wheels 36 as the transport members 28. In this embodiment, wheels 36 are rotatably attached to frame 44 at a wheel support 66 on each of the first 30 and second 32 sides of platform 22 by wheel axles 68 cooperatively received in wheel supports 66, as best shown in FIG. 5. As will be known to those skilled in the art, wheels 36 can be configured to rotate relative to platform 22 in a variety of different configurations, including a single wheel axle that extends from first 30 to second 32 sides of platform 22. When used with bicycle 34 or a motorcycle as the towing element 12 or when a person or an animal, such as a horse or dog, is to tow patient supporting carrier 10, with or without a patient thereon, wheels 36 are likely to be the best configuration for transport members 28. As set forth below, other uses will generally suggest alternative configurations for transport members 28.

For use to be towed by towing element 12, such as bicycle 34, patient supporting carrier 10 includes a tow connector member 70 attached to the first end 24 of platform 22. In the configuration shown in the figures, tow connector member 70 comprises a base member 72 that attaches to frame 44 and an engagement pin 74, one end of which is received in base member 72 and the second, outwardly extending end is adapted to connect to the desired tow member 14, as best shown in FIGS. 1 through 5. In the embodiment shown, engagement pin 74 has an opening 76 through which a bolt or other connector is received for removable connection to tow member 14, as best shown in FIGS. 1 through 3. In the preferred embodiment, tow connector member 70 removably attaches to tow member 14 so that the user may disconnect patient supporting carrier 10 from the towing element 12 and/or tow member 14 when not in use. In an alternative embodiment, tow connector member 70 can be fixedly attached or integral with tow member 14. In addition, tow member 14 and tow connector member 70 can be configured to attach at the sides 30 and 32 of platform 22 instead of at its first end 24.

In one preferred configuration, frame 44 is made out of aluminum tubes and support member 48 is an aluminum plate, with each support section being approximately eighteen inches wide and twenty-four inches long, for an overall length of six feet, with ten inch diameter wheels 36 near the second end 26 of platform 22. In one such configuration, patient supporting carrier 10 weighs approximately 30 pounds. When stored or being transported to where patient supporting carrier 10 will be needed, it is locked in the collapsed condition 16 by locking pins 64 received in first 58 and second 60 connecting members. In the collapsed condition 16, support member 48 of first support section 38 defines support surface 20 that is useful for carrying various medical supplies and other materials that may be needed to assist an injured person, effectively providing a trailer for the EMT or other person riding bicycle 34, as best shown in FIG. 1. In this configuration, the user can ride bicycle 34 in crowds, to remote areas or across rugged terrain to get to an injured person. Once he or she arrives at the injury site, the user removes locking pins 64 from first 50 and second 52 connecting mechanisms and unfolds patient supporting carrier 10 to its extended condition 18 to obtain platform 22, as defined by first 38, second 40 and third 42 support sections. To maintain the support sections 38, 40 and 42 as a platform 22 to support the patient, the user reinserts the locking pins 64 into the first 50 and second 52 connecting mechanisms. The injured person is then placed on platform 22 and prepared for transport by, if desired or necessary, strapping the patient down on platform 22 by feeding straps or other materials through holes 54 or slots 56 in the various support members 38, 40 and 42. Once the patient is immobilized, the user can ride bicycle 34 and transport the patient to an area for further treatment or transport to a hospital or other facility. After the patient is removed from platform 22, the user can place patient supporting carrier 10 in its collapsed condition 16 by simply removing locking pins 64 from first 50 and second 52 connecting mechanisms, folding second support section 40 on top of third support section 42 and then folding first support section 38 on top of second support section 40, thereby disposing second support section 40 between the first 38 and third support sections. The locking pins 64 are then reinserted into first 50 and second 52 connecting mechanisms to maintain patient supporting carrier in the collapsed condition 16.

For use in police or military operations, particularly for use on the battlefield, support members 48 can be made out of materials that are at least substantially resistant to penetration by bullets and shrapnel so a medic or other police or military personnel can protect themselves and the injured person from harm. For instance, Kevlar® and other advanced technology materials can be utilized for support members 48. Utilizing the patient supporting carrier 10 of the present invention, a medic can quickly bring his or her medical supplies and the backboard or stretcher to the front lines, whether a police action or battlefield, and then place an injured person on platform 22 to quickly transport the person away from the action to a place where the patient can be better treated or evacuated to a hospital. Using support surface 20, the medic can easily carry sufficient medical supplies to provide on-site emergency medical care. The wheels 36 or other transport members 28 attached to platform 22 allow a single rescue person to quickly and safely remove the patient from the front lines, thereby eliminating the need to utilize other, and generally limited, front line personnel to assist with the removal of the injured person. Even without use of transport members 28 or tow member 14, patient supporting carrier 10 is useful for carrying in a backpack or other container in its collapsed condition 16 and then removed and placed in the extended condition to remove an injured person from the place of action to a rearward area for medical treatment and/or evacuation.

Figure 7:
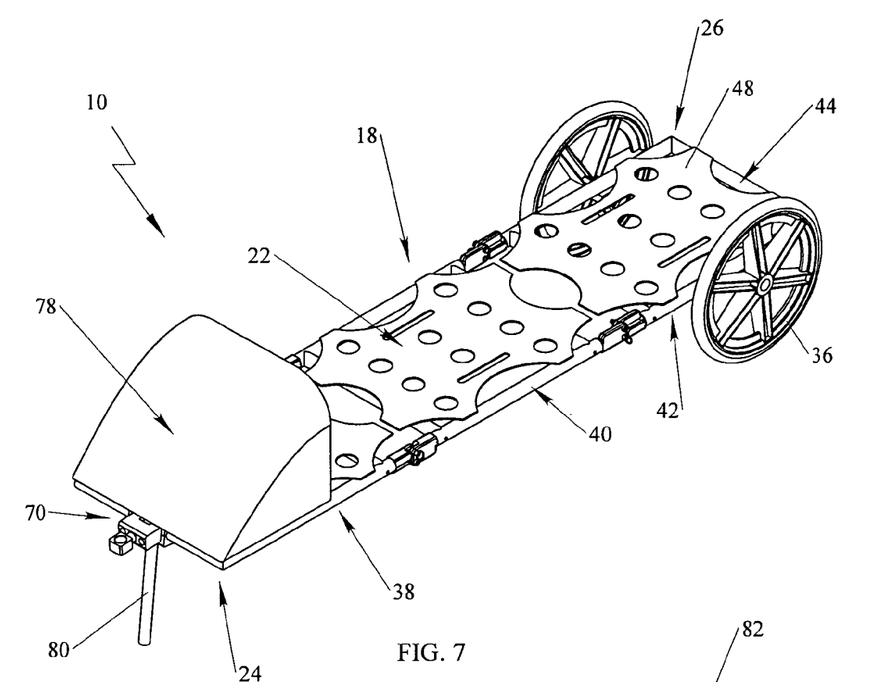
FIG. 7 is a top perspective view of an alternative embodiment of the patient supporting carrier of the present invention shown with a windshield and a support post attached to the front section of the extended backboard.

In the alternative embodiment shown in FIG. 7, patient supporting carrier 10 includes a shield 78 that is configured to substantially block the wind, sun, rain and/or other elements from an injured person laying on platform 22. In a preferred configuration, shield 78 is configured with a cavity or enclosed area, not shown, in which a portion of the injured person is received when he or she is laying on platform 22. The alternative embodiment of FIG. 7 also includes one or more support rods 80 that support platform 22 in a nearly horizontal position above the ground or other surface when patient supporting carrier 10 is disconnected from towing element 12 and/or tow member 14. This configuration will allow a user to place an injured person on platform 22 and leave him or her there while the user takes bicycle 34 to obtain additional assistance or supplies. In the preferred configuration of this embodiment, support rod 80 is pivotally attached to the underside of first support section 38 so that it can be selectively pivoted downward to support platform 22 when needed. To prevent problems when patient supporting carrier 10 is being towed, it is preferred that support rod 80 locks in the up or non-use position.

Figure 8:
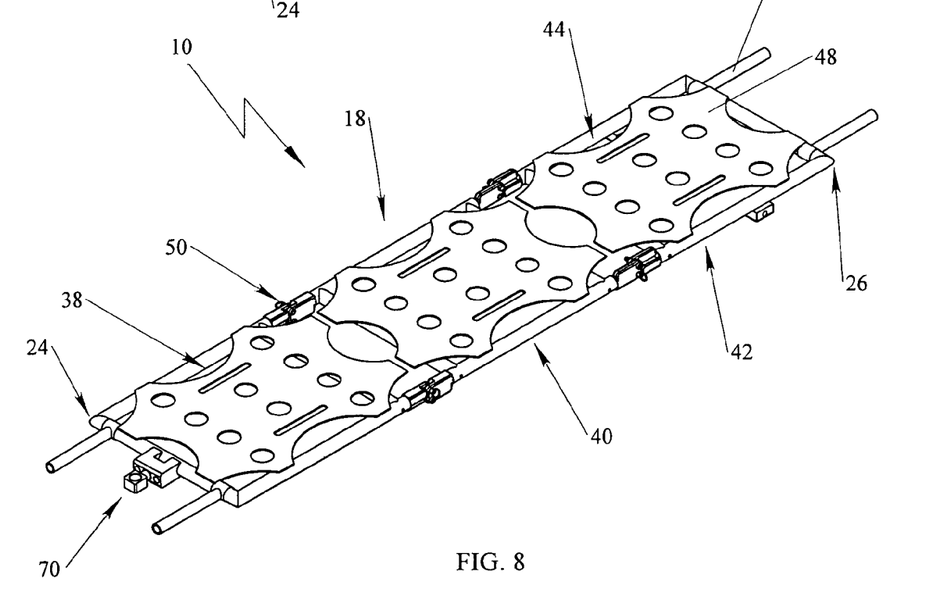
FIG. 8 is a perspective top view of an alternative embodiment of the towable collapsible patient supporting carrier of the present invention showing the use of extended pole handles at the ends of the backboard.

In the alternative embodiment of FIG. 8, patient supporting carrier 10 is provided with a pair of handles 82, such as the pole handles shown, that extend outwardly from first 24 and second 26 ends of platform 22 to allow two or more rescuers to carry patient supporting carrier 10, with a patient on platform 22, in a traditional stretcher manner. Handles 82 can be attached, fixedly or removably, to frame 44 and configured such that they are fixed in the outwardly extending position or are pivotally attached to frame 44 to pivot to the underside of first 38 and third 42 support sections. Alternatively, handles 82 can be configured to retract from frame 44, such as being telescoping or removably disposed, at least partially, inside frame members 46.

Figure 9:
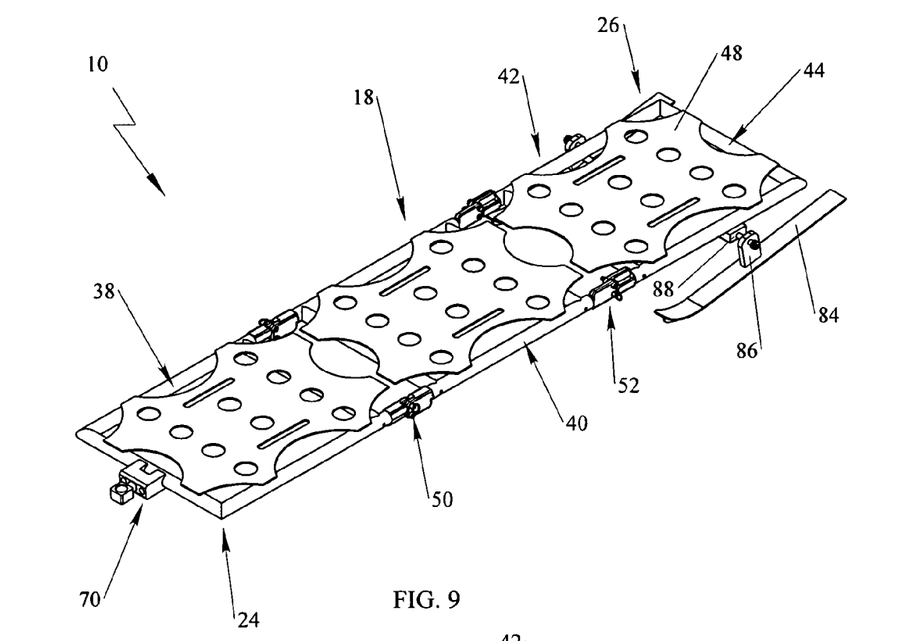
FIG. 9 is a perspective top view of an alternative configuration of the towable collapsible patient supporting carrier of the present invention showing the use of skis at the rear of the backboard.
Figure 10:
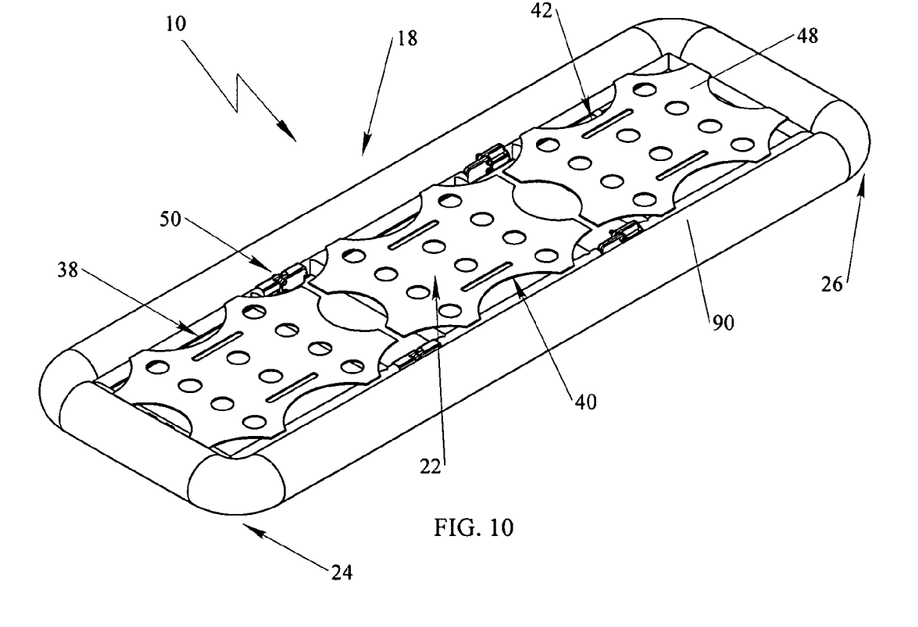
FIG. 10 is a perspective view of an alternative configuration of the towable collapsible patient supporting carrier of the present invention showing the use of a floatation system around the perimeter of the backboard.

The embodiments of FIGS. 9 and 10 show the patient supporting carrier of the present invention configured for use in the snow (FIG. 9) and on a body of water (FIG. 10). In the embodiment of FIG. 9, transport members 28 are skis or sled members 84 instead of wheels 36. Each of skis 84 have a ski support member 86 attached thereto that connect to ski axles 88. In a preferred embodiment, skis 84 are configured to at least slightly pivot to allow skis 84 to better follow the terrain. In the embodiment of FIG. 10, transport member 28 is an inflatable floatation member 90 instead of wheels 36. In a preferred configuration of this embodiment, floatation member 90 comprises an air filled chamber that is positioned at the periphery of platform 22 and configured to support patient supporting carrier 10 and a patient positioned thereon on a body of water, such as a river, lake, ocean or the like. Floatation member 90 can be configured in one or a plurality of air chambers with one or more air intake valves, not shown, suitable for the user to fill floatation member 90. In one embodiment, not shown, patent supporting carrier can include a manual air pump (i.e., hand or foot) or an electric or other powered air pump for filling floatation member 90 with pressurized air.

Figure 11:
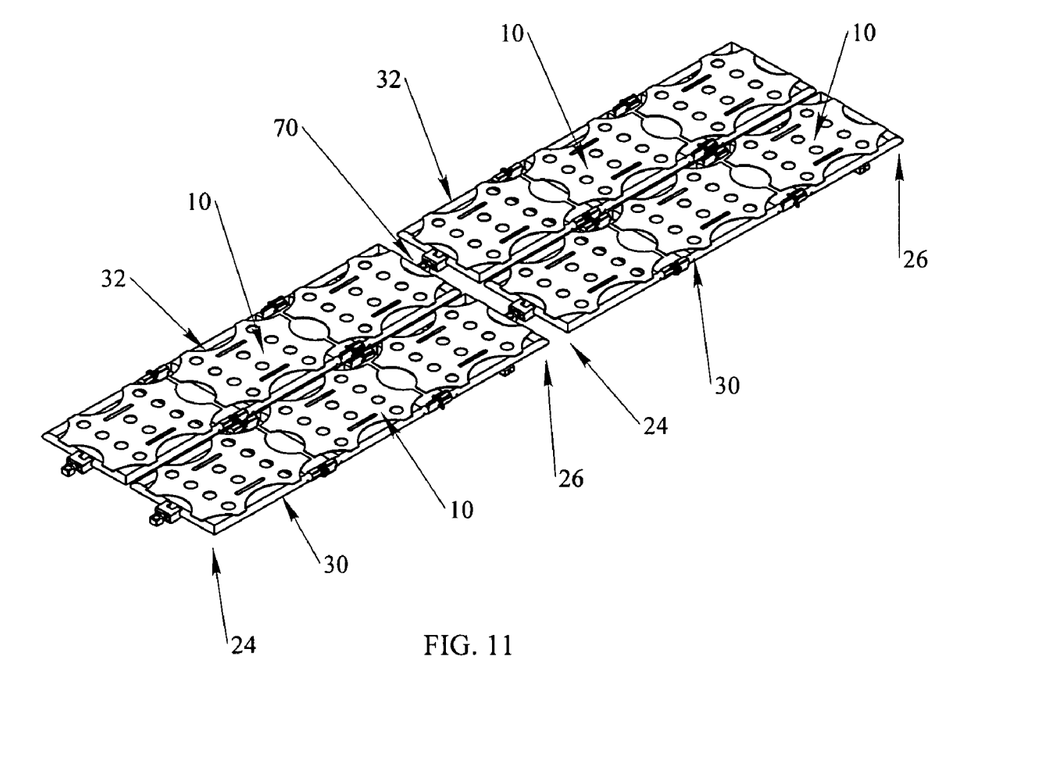
FIG. 11 is a perspective top view showing use of four patient supporting carriers of the present invention that are joined together to form a large platform.

The embodiment of FIG. 11 shows the use of multiple patient supporting carriers 10 connected together to form a larger sized platform. In the embodiment shown, two rows of patient supporting carriers 10 are utilized. In this embodiment, tow connector member 70 at the first end 24 of platform 22 is configured to connect to the second end 26 of another platform 22, and first 50 and second 52 connecting members on the first side 30 of one platform 22 is configured to connect to the first 50 and second 52 connecting members on the second side 32 of an adjacent platform 22. If desired, transport members 28, such as wheels 36, can be attached to the outer sides of both rows, thereby having four wheels 36 instead of the two shown in the other figures, to better support the larger platform of this embodiment. The first ends 24 of the first row of patient supporting carriers 10 have tow connector members 70 configured to attach to a towing element 12 of sufficient size to tow the combined platforms.

In the use of the present invention where the towing element 12 is an EMT or another person who manually pulls the patient supporting carrier 10 behind him or her, a handle or other grasping mechanism (not shown) can be provided to allow the user to sufficiently grasp so as to be able to pull patient supporting carrier 10 to the location where its use is necessary or desired. Alternatively, the user can remove tow connector member 70 and grasp directly onto the frame 44 or remove both tow connector member 70 and the transport members 28, such as wheels 36, and carry the patient supporting carrier 10 in its collapsed condition 16 in a backpack or other portable container to the location where it is needed to remove an injured person. When tow connector member 70 is used, with any type of towing element 12, it can be positioned along the sides 30 and 32 of platform 22 instead of at the first end thereof.

While there are shown and described herein specific forms of the invention, it will be readily apparent to those skilled in the art that the invention is not so limited, but is susceptible to various modifications and rearrangements in design and materials without departing from the spirit and scope of the present invention. In particular, it should be noted that the present invention is subject to modification with regard to any dimensional relationships set forth herein, which are merely presented for exemplary purposes, and modifications in assembly, materials, size, shape, and use. For instance, there are numerous components described herein that can be replaced with equivalent functioning components to accomplish the objectives of the present invention.

What is claimed is:

1. A patient supporting carrier for transporting a patient, comprising:
  a plurality of support sections defining a platform having a first end and a second end, each of said support sections having a frame and one or more support members attached to said frame, said support sections comprising at least a first support section and a second support section;
  means for connecting said first support section to said second support section, said connecting means configured to selectively place the patient supporting carrier in a collapsed condition by pivoting said support member of said first support section on top of said support member of said second support section and in an extended condition;
  at least one transport member connected to said frame of one of said first support section and said second support section; and
  a tow connector member attached to said frame of said first support section, said tow connector member configured to connect to one or more tow members for towing the patient supporting carrier behind a towing element when the patient supporting carrier is in said collapsed condition and in said extended condition.

2. The patient supporting carrier according to claim 1, wherein said at least one transport member is a pair of wheels and said towing element is a bicycle.

3. The patient supporting carrier according to claim 1, wherein said at least one transport member is a pair of skis.

4. The patient supporting carrier according to claim 1, wherein said at least one transport member is a floatation member.

5. The patient supporting carrier according to claim 1, wherein each of said one or more support members are substantially rigid to define said platform as a backboard.

6. The patient supporting carrier according to claim 5, wherein said support section of at least one of said first support section and said second support section comprises one or more hole and/or slots utilized to secure the patient to said platform.

7. The patient supporting carrier according to claim 6, wherein said platform is substantially planar.

8. The patient supporting carrier according to claim 1, wherein said tow connector member comprises a base member connected to said frame of said first support section and an engagement pin outwardly from said base member, said engagement pin configured to removably connect to said or more tow member.

9. The patient supporting carrier according to claim 1, wherein said connecting means further comprises a means for locking the patient supporting carrier in said collapsed condition and said extended condition.

10. The patient supporting carrier according to claim 1, wherein said at least one transport member is removably connected to said frame.

11. The patient supporting carrier according to claim 1, wherein said support member of at least one of said plurality of support sections defines a support surface when the patient supporting carrier is in said collapsed condition.

12. The patient supporting carrier according to claim 1 further comprising a shield attached to at least one of said plurality of support sections.

13. A patient supporting carrier for transporting a patient, comprising:
  a plurality of support sections defining an elongated platform having a first end and a second end, each of said support sections having a frame and one or more support members attached to said frame, said support sections comprising at least a first support section and a second support section;
  means for connecting said first support section to said second support section, said connecting means configured to selectively place the patient supporting carrier in a collapsed condition by pivoting said support member of said first support section on top of said support member of said second support section and in an extended condition;
  at least one transport member operatively connected to said frame of one of said first support section and said second support section; and
  a tow connector member attached to said frame of said first support section at said first end of said platform, said tow connector member configured to connect to one or more tow members for towing the patient supporting carrier behind a towing element, said first support section, said second support section and said tow connector cooperatively configured to dispose said tow connector in position to connect to said one or more tow member when the patient support carrier is in each of said collapsed condition and said extended condition.

14. The patient supporting carrier according to claim 13, wherein said at least one transport member is a pair of wheels and said towing element is a bicycle.

15. The patient supporting carrier according to claim 13, wherein said connecting means further comprises a means for locking the patient supporting carrier in said collapsed condition and said extended condition and said connecting means is configured to pivot said first support section on top of said second support section.

16. The patient supporting carrier according to claim 13, wherein said connecting means further comprises a means for locking the patient supporting carrier in said collapsed condition and said extended condition.

17. The patient supporting carrier according to claim 13, wherein said support section of at least one of said first support section and second section comprises one or more holes and/or slots utilized to secure the patient to said platform.

18. A collapsible backboard for transporting a patient, comprising:
a plurality of support sections defining an elongated platform having a first end and a second end, each of said support sections having a frame and one or more substantially rigid support members attached to said frame, said support sections comprising at least a first support section and a second support section; and
a first connecting mechanism interconnecting said first support section and said second support section, said first connecting mechanism configured to selectively place the backboard in a collapsed condition by pivoting said support member of said first support section on top of said support member of said second support section and in an extended condition.

19. The backboard according to claim 18 further comprising at least one transport member operatively connected to said frame of one of said first support section and said second support section and a tow connector member attached to said frame of said first support section at said first end of said platform, said tow connector member configured to connect to one or more tow members for towing the backboard behind a towing element when the patient support carrier is in said collapsed condition and in said extended condition.

20. The backboard according to claim 18, wherein said first connecting mechanism further comprises a locking pin configured to lock the backboard in said collapsed condition and said extended condition.

21. The backboard according to claim 18, wherein said first connecting mechanism comprises a first connecting member on said first support section, a second connecting member on said second support section and a pivot member pivotally connecting said first connecting member and said second support section, said pivot member configured to pivot said first support section between said collapsed condition and said extended condition.

22. The backboard according to claim 18, wherein said plurality of support sections further comprises a third support section and said backboard further comprises a second connecting mechanism interconnecting said second support section and said third support section, said first connecting mechanism and said second connecting mechanism configured to selectively place the backboard in said collapsed condition defining a support surface and in said extended condition defining said elongated platform.

23. The backboard according to claim 22 further comprising at least one transport member operatively connected to said frame of one of said first support section and said second support section and a tow connector member attached to said frame of said first support section at said first end of said platform, said first support section, said second support section, said third support section and said tow connector cooperatively configured to dispose said tow connector in position to connect to one or more tow members for towing the backboard behind a towing element when the patient supporting carrier is in each of said collapsed condition and said extended condition.

24. The backboard according to claim 18, wherein said first connecting mechanism further comprises a locking pin configured to lock the backboard in said collapsed condition and said extended condition.

* * * * *